United States Patent
Cho et al.

(10) Patent No.: US 11,427,183 B2
(45) Date of Patent: Aug. 30, 2022

(54) INTEGRATED CHASSIS CONTROL METHOD TO IMPROVE DRIVING STABILITY ON MOUNTAIN ROAD AND VEHICLE USING THE SAME

(71) Applicants: Hyundai Motor Company, Seoul (KR); Kia Motors Corporation, Seoul (KR)

(72) Inventors: Jae-Sung Cho, Suwon-si (KR); Sung-Wook Hwang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 960 days.

(21) Appl. No.: 16/191,235

(22) Filed: Nov. 14, 2018

(65) Prior Publication Data
US 2019/0176811 A1    Jun. 13, 2019

(30) Foreign Application Priority Data
Dec. 11, 2017    (KR) ........................ 10-2017-0169091

(51) Int. Cl.
*B60G 17/0165*    (2006.01)
*B60W 30/045*    (2012.01)
*B60W 10/119*    (2012.01)
*B60W 10/22*    (2006.01)

(52) U.S. Cl.
CPC ....... *B60W 30/045* (2013.01); *B60G 17/0165* (2013.01); *B60W 10/119* (2013.01); *B60W 10/22* (2013.01); *B60G 2500/10* (2013.01); *B60G 2800/244* (2013.01); *B60G 2800/246* (2013.01); *B60W 2420/42* (2013.01); *B60W 2552/15* (2020.02); *B60W 2555/60* (2020.02);
(Continued)

(58) Field of Classification Search
CPC .. B60W 30/045; B60W 10/119; B60W 10/22; B60W 2556/50; B60W 2555/60; B60W 2552/15; B60W 2420/42; B60W 2710/226; B60W 2720/40; B60G 17/0165; B60G 2500/10; B60G 2800/244; B60G 2800/246
See application file for complete search history.

(56) References Cited

U.S. PATENT DOCUMENTS 9,096,229 B2 *   8/2015  Eriksson ............... B60W 10/06
10,336,328 B2 *   7/2019  Yoon .................... B60W 30/143
10,794,475 B2 * 10/2020  Jeon ..................... F16H 61/0213
(Continued)

FOREIGN PATENT DOCUMENTS

KR    10-2007-0060851 A    6/2007
KR       20140119433 A    10/2014
(Continued)

*Primary Examiner* — Toan C To
(74) *Attorney, Agent, or Firm* — Morgan, Lewis & Bockius LLP (57) ABSTRACT

An integrated chassis control method to improve driving stability may include mountain-road integrated chassis control allowing, when a road on which a vehicle drives is checked to be the route of a mountain road by an integrated chassis controller, electronic control suspension (ECS) damping force and all wheel drive (AWD) driving force distribution to be controlled in a different manner according to uphill and downhill roads due to a difference of elevation of the mountain road.

14 Claims, 10 Drawing Sheets

(52) U.S. Cl.
CPC ... *B60W 2556/50* (2020.02); *B60W 2710/226* (2013.01); *B60W 2720/40* (2013.01)

(56) References Cited

U.S. PATENT DOCUMENTS

| | | | |
|---|---|---|---|
| 11,022,212 B2* | 6/2021 | Ooshima | F16H 61/0213 |
| 11,059,480 B2* | 7/2021 | Graves | B60W 40/076 |
| 11,067,165 B2* | 7/2021 | Ooshima | F16H 61/0213 |
| 2006/0074530 A1* | 4/2006 | Meyers | B60W 10/119 |
| | | | 701/1 |
| 2008/0183353 A1* | 7/2008 | Post | B60W 10/184 |
| | | | 701/84 |
| 2010/0305810 A1 | 12/2010 | Tan | |
| 2014/0297115 A1 | 10/2014 | Kang et al. | |
| 2017/0197485 A1 | 7/2017 | Sohn | |
| 2017/0361847 A1* | 12/2017 | Marutani | B60W 30/18027 |
| 2018/0162444 A1 | 6/2018 | Park | |
| 2020/0070836 A1* | 3/2020 | Suzuki | B60L 15/2009 |
| 2020/0361482 A1* | 11/2020 | Choi | G01C 21/365 |

FOREIGN PATENT DOCUMENTS

| | | |
|---|---|---|
| KR | 10-2016-0057858 A | 5/2016 |
| KR | 10-2017-0084830 A | 7/2017 |

* cited by examiner

$$\frac{dV_x}{dt} = \alpha_x - g \cdot \sin\theta = V_x - r \cdot V_y$$

$$\therefore \theta = \sin^{-1}\left[\frac{\alpha_x - (V_x - r \cdot V_y)}{g}\right]$$

ROAD GRADIENT ESTIMATION EQUATION $$\therefore \text{Gradient} = \tan\left[\sin^{-1}\left[\frac{\alpha_x - (V_x - r \cdot V_y)}{g}\right]\right]$$

| ROAD | LOAD CHANGE | | ECS DAMPING FORCE | AWD DRIVING FORCE | EFFECT |
|---|---|---|---|---|---|
| UPHILL | FRONT WHEEL | DECREASE | REAR-WHEEL INCREASE | FOUR-WHEELED (WEAK REAR-WHEEL INCREASE) | AGILITY IMPROVEMENT |
| | REAR WHEEL | INCREASED | | | |
| DOWNHILL | FRONT WHEEL | INCREASED | REAR-WHEEL INCREASE | FOUR-WHEELED (WEAK REAR-WHEEL INCREASE) | AGILITY IMPROVEMENT |
| | REAR WHEEL | DECREASE | | | |

FIG. 9

| ROAD CONDITION | VERTICAL LOAD CHANGE | | | DAMPING FORCE CHANGE IN FRONT AND REAR WHEELS | | | EFFECT |
|---|---|---|---|---|---|---|---|
| | | ACCELERATION | DECELERATION | AGILITY | STABILITY | | |
| UPHILL ROAD | FRONT WHEEL DECREASE | − | + | AGILITY | HARD | ACCELE-RATION | IMPROVEMENT IN AGILITY PERFORMANCE COMPARED TO STABILITY PERFORMANCE |
| | REAR WHEEL INCREASE | − | + | AGILITY | SOFT | DECELE-RATION | REDUCTION IN DECREASE DEGREE OF STABILITY PERFORMANCE COMPARED TO IMPROVEMENT IN AGILITY PERFORMANCE |
| DOWNHILL ROAD | FRONT WHEEL INCREASE | − | + | AGILITY | STABILITY | ACCELE-RATION | IMPROVEMENT IN AGILITY PERFORMANCE COMPARED TO STABILITY PERFORMANCE |
| | REAR WHEEL DECREASE | − | + | AGILITY | STABILITY | DECELE-RATION | IMPROVEMENT IN AGILITY PERFORMANCE COMPARED TO STABILITY PERFORMANCE |

FIG. 10

INTEGRATED CHASSIS CONTROL METHOD TO IMPROVE DRIVING STABILITY ON MOUNTAIN ROAD AND VEHICLE USING THE SAME

CROSS-REFERENCE(S) TO RELATED APPLICATIONS

The present application claims priority to Korean Patent Application No. 10-2017-0169091, filed on Dec. 11, 2017, the entire contents of which is incorporated herein for all purposes by this reference.

BACKGROUND OF THE INVENTION

Field of the Invention

The present invention relates to integrated chassis control on a mountain road driving, and more particularly, to a vehicle using effective integrated chassis control suitable for the route of a curved mountain road and a winding road having a great difference of elevation.

Description of Related Art

In general, integrated chassis control allows driving stability to be maintained by controlling the turning stability and controllability of a vehicle with respect to a change in road condition.

For example, the integrated chassis control allows driving stability to be maintained by controlling the driving force of an all wheel drive (AWD) and controllably distributing the front- and rear-roll damping force of an electronic control suspension (ECS) for the control of turning stability and controllability in a road condition that causes deterioration of traveling stability, wherein the AWD and the ECS are each set as a control target.

However, it is necessary to improve the vehicle driving stability of the conventional integrated chassis control since the difference of elevation of the road causing a vehicle load change is inadequately reflected thereon.

This example may include the route of a curved mountain road, such as an ascent or a descent, having a great difference of elevation, and the wide vehicle load change may be caused when the vehicle drives on the very winding road and the curved mountain road. Hence, it may be difficult to control turning stability and controllability for maintaining vehicle driving stability just by controlling the torque of the AWD and controllably distributing the front- and rear-roll damping force of the ECS in the related art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an integrated chassis control method based on mountain road, configured for optimally controlling distribution of front- and rear-roll damping force of an ECS together with torque of an AWD to maintain vehicle driving stability in a driving situation on the route of a mountain road (i.e., a curved mountain road and a winding road having a great difference of elevation), and particularly of improving turning stability and controllability necessary to maintain the vehicle driving stability by controlling the torque of the AWD and controllably distributing the front- and rear-roll damping force of the ECS, considering a vehicle load change varying every moment in a driving situation on a very winding road, and a vehicle using the same.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, an integrated chassis control method may include mountain-road integrated chassis control allowing, when a road on which a vehicle drives is verified to be the route of a mountain road by an integrated chassis controller, ECS damping force and AWD torque distribution to be controlled in a different manner according to uphill and downhill roads due to a difference of elevation of the mountain road.

The mountain road may be verified from information generated by one of a navigation, a camera, and a vehicle sensor. The generated information may be divided into navi-information related to the navigation, image information related to the camera, and sensor information related to the vehicle sensor. The mountain road may be determined to be a curved mountain road based on one of the navi-information, the image information, and the sensor information. The sensor information may be used when the use of the navi-information and the image information is impossible.

The mountain-road integrated chassis control may include curved mountain road check control in which the route of the mountain road is determined to be the route of a curved mountain road based on information generated by an in-vehicle device of the vehicle and a mountain road flag is generated, curved mountain road entry control in which the route of the mountain road is divided into the uphill road and the downhill road and an ascent flag on the uphill road and a descent flag on the downhill road are generated after determining the curved mountain road, uphill integrated chassis control in which the ECS damping force and the AWD torque distribution are controlled according to the ascent flag, and downhill integrated chassis control in which the ECS damping force and the AWD torque distribution are controlled according to the descent flag.

In the mountain-road integrated chassis control, the curved mountain road check control may be divided into checking each of a navigation, a camera, and a vehicle sensor used as the in-vehicle device, determining the curved mountain road based on road position information on a mountain name and navi-road curvature information on a road condition according to navi-information when the navigation is verified, determining the curved mountain road based on road sign information on a road sign and camera-road curvature information on a lane condition according to image information when the camera is verified, and determining the curved mountain road based on road gradient information as a road information and vehicle lateral acceleration information as a vehicle information according to sensor information when the vehicle sensor is verified.

In the curved mountain road check control, the road position information may be place name information, and the navi-road curvature information may be road curvature information according to a route number. The road sign information may be a double-curved road sign or an uphill/downhill slop sign, and the camera-road curvature information may be road curvature information on a curved road arrow sign. The road gradient information and the vehicle lateral acceleration information may be an estimated road gradient absolute value and a lateral acceleration absolute value relating to vehicle speed and acceleration, respectively. The estimated road gradient absolute value and the lateral acceleration absolute value may be each equal to or greater than a certain number of times of repetition, and be used for the road gradient information and the vehicle lateral acceleration information.

In the mountain-road integrated chassis control, the curved mountain road entry control may be divided into checking each of a camera and a vehicle sensor used as the in-vehicle device, checking the uphill road and the downhill road based on an uphill/downhill slop sign according to image information when the camera is verified, checking the uphill road and the downhill road based on an estimated road gradient absolute value when the vehicle sensor is verified, and generating the ascent flag on the uphill road when the uphill road is verified while generating the descent flag on the downhill road when the downhill road is verified.

In the curved mountain road entry control, the estimated road gradient absolute value may be used to check the uphill road and the downhill road when it is equal to or greater than a certain number of times of repetition.

In the mountain-road integrated chassis control, the uphill integrated chassis control may be divided into controlling a controlled variable of a damper with an ECS controller according to an increase in rear-wheel damping force of a rear-wheel suspension for controlling the ECS damping force while controlling a distribution amount of torque with an AWD controller according to an increase in rear-wheel driving force of a rear wheel for controlling the AWD torque distribution, detecting a load change according to a change in damping force of front- and rear-wheel suspensions when the vehicle drives on the uphill road, controlling the controlled variable of the damper and the distribution amount of the driving force according to the detected load change while performing oversteer compensation control by applying the controlled variable of the damper and the distribution amount of the driving force to the control of the ECS damping force and the control of the AWD torque distribution, and completing the oversteer compensation control by repeating the detection of the load change.

In the mountain-road integrated chassis control, the downhill integrated chassis control may be divided into controlling a controlled variable of a damper with an ECS controller according to an increase in front-wheel damping force of a front-wheel suspension for controlling the ECS damping force while controlling a distribution amount of torque with an AWD controller according to an increase in front-wheel driving force of a front wheel for controlling the AWD driving force distribution, detecting a load change according to a change in damping force of front- and rear-wheel suspensions when the vehicle drives on the downhill road, controlling the controlled variable of the damper and the distribution amount of the driving force according to the detected load change while performing understeer compensation control by applying the controlled variable of the damper and the distribution amount of the driving force to the control of the ECS damping force and the control of the AWD torque distribution, and completing the understeer compensation control by repeating the detection of the load change.

Normal integrated chassis control may be performed according to a non-mountain road including a flatland when the route of the mountain road is not verified.

In accordance with various exemplary embodiments of the present invention, a vehicle may include an ECS controller for controlling damping force of each of front- and rear-wheel suspensions, an AWD controller for controlling distribution of torque to each of front and rear wheels, an in-vehicle device including one of a navigation, a camera, and a vehicle sensor, and an integrated chassis controller for performing mountain-road integrated chassis control allowing, when the route of a mountain road is verified based on information generated by one of the navigation, the camera, and the vehicle sensor, ECS damping force and AWD torque distribution to be controlled with the ECS controller and the AWD controller in a different manner according to uphill and downhill roads of the mountain road.

The integrated chassis controller may include a mountain road recognition unit configured to recognize the route of the mountain road as a curved mountain road, a road elevation determination unit configured to determine that the uphill and downhill roads have a difference of elevation, and a controlled variable controller configured to determine each of a controlled variable of the ECS controller for controlling the ECS damping force and a controlled variable of the AWD controller for controlling the AWD torque distribution.

The integrated chassis controller may perform integrated chassis control suitable for the route of a non-mountain road by changing to normal integrated chassis control when the mountain-road integrated chassis control is not performed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention will be described below in more detail with reference to the accompanying drawings. The present invention may, however, be embodied in different forms and should not be construed as limited to the exemplary embodiments set forth herein. Rather, these embodiments are provided so that the present disclosure will be thorough and complete, and will fully convey the scope of the present invention to those skilled in the art. Throughout the disclosure, like reference numerals refer to like parts throughout the various figures and embodiments of the present invention.

Figure 1:
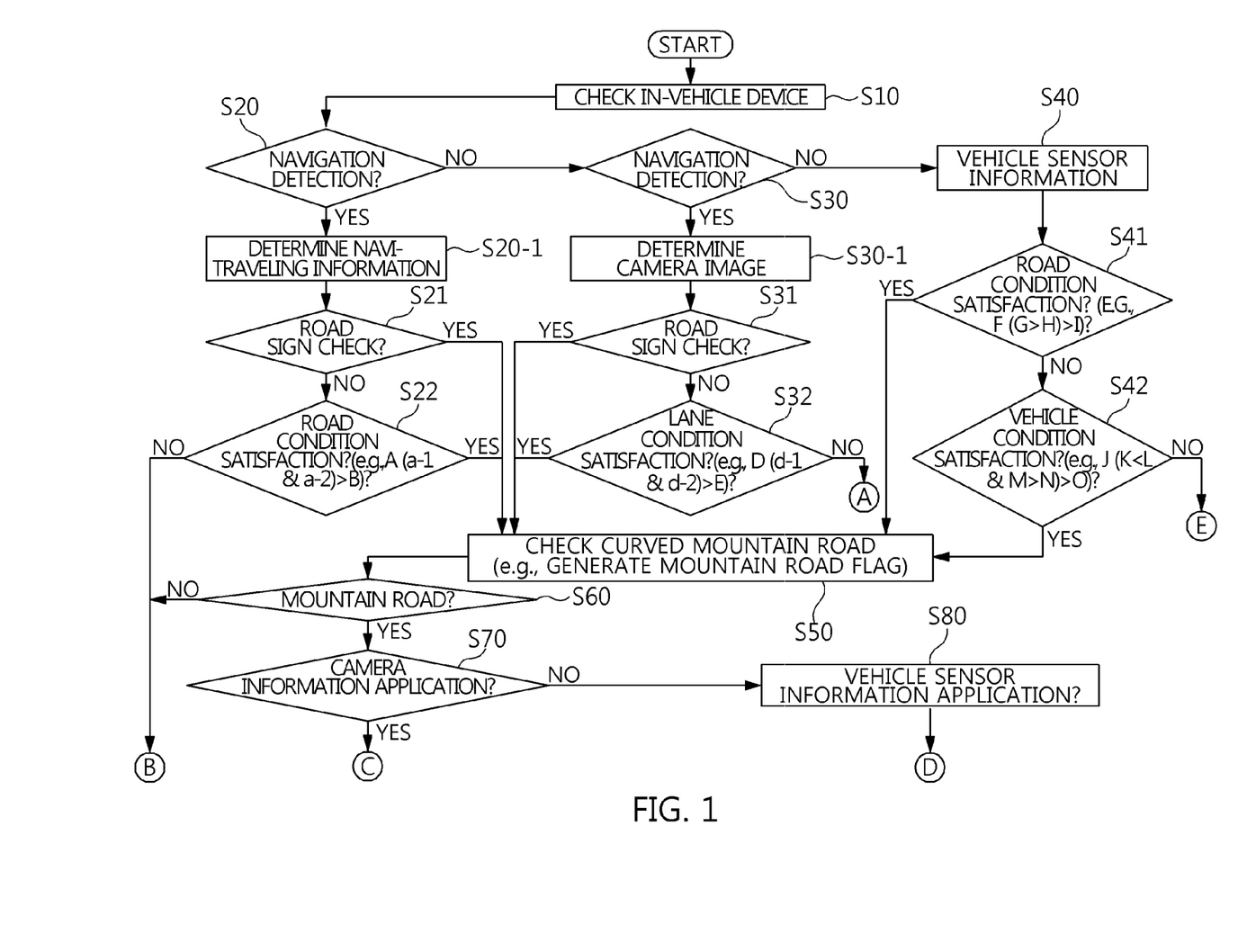
FIG. 1 and FIG. 2 are flowcharts illustrating an integrated chassis control method to improve driving stability on the route of the mountain road according to an exemplary embodiment of the present invention.
Figure 2:
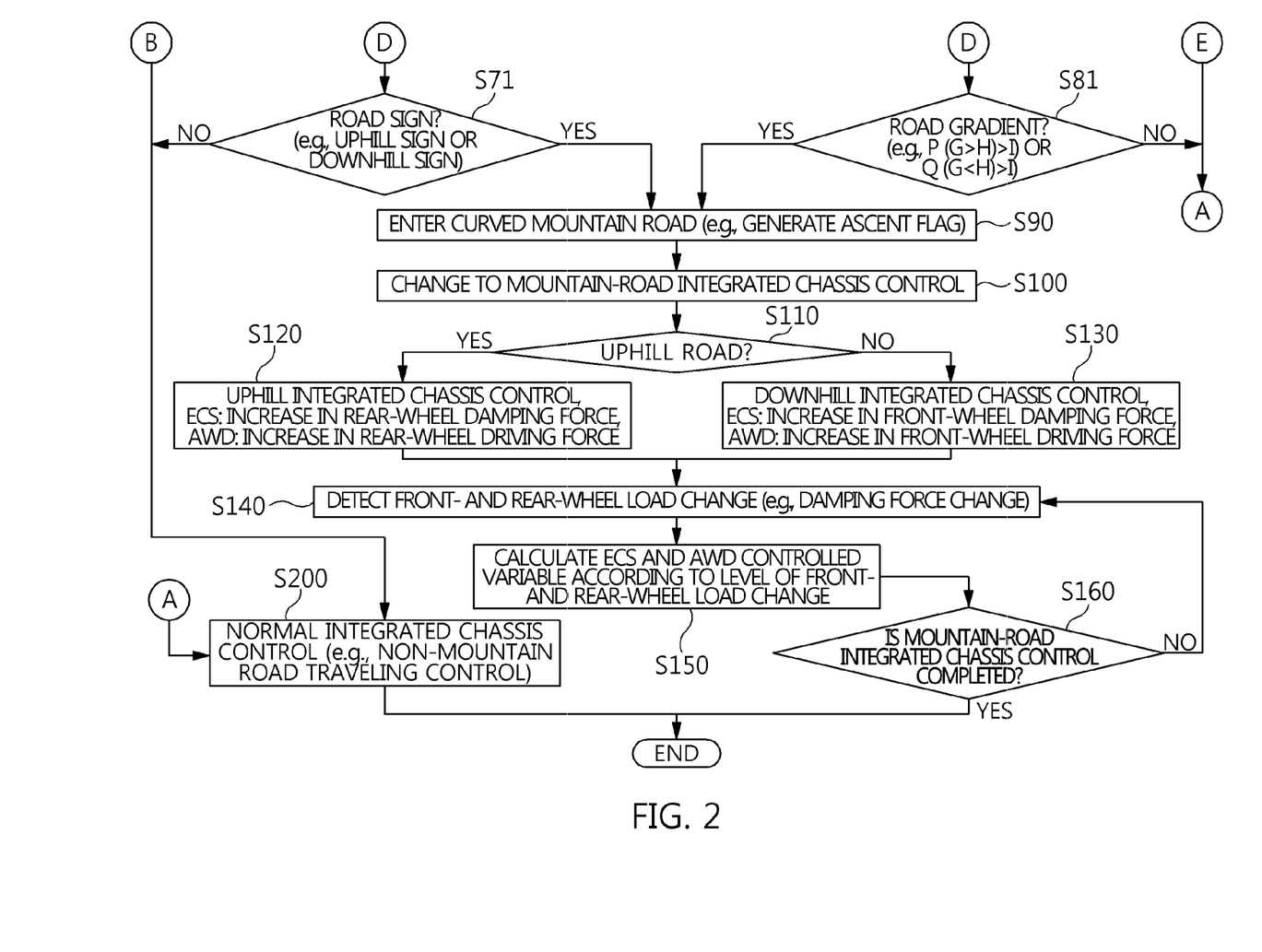

Referring to FIG. 1 and FIG. 2, an integrated chassis control method according to an exemplary embodiment of the present invention is performed by controlling a check for the route of a curved mountain road and a winding road from an in-vehicle device checked when a vehicle drives on a mountain road having a great difference of elevation (S10 to S50), controlling entry to the curved mountain road after the mountain road is determined by the checked in-vehicle device (S60 to S90), and performing mountain-road integrated chassis control divided into uphill integrated chassis control and downhill integrated chassis control when the vehicle drives the route of the curved mountain road having continuously excessive ascents and descents (S100 to S160).

In the uphill integrated chassis control, turning agility is improved since a decrease in lateral force is increased (front-wheel lateral force is relatively increased) and rear-wheel driving force is maximized due to a horizontal load change caused by increasing the damping force of the rear wheel, the load of which is increased in an uphill control manner. In the downhill integrated chassis control, turning stability is improved since a decrease in lateral force is increased (rear-wheel lateral force is relatively increased) and front-wheel driving force is maximized due to a horizontal load change caused by increasing the damping force of the front wheel, the load of which is increased in a downhill control manner.

As a result, the integrated chassis control method can control turning stability/controllability to improve handling performance (turning agility and stability) by controlling the torque of an all wheel drive (AWD) and distributing front- and rear-roll damping force of an electronic control suspension (ECS), considering a vehicle load change which may be caused when the vehicle drives on the route of the winding road and the curved mountain road having a great difference of elevation.

Figure 3:
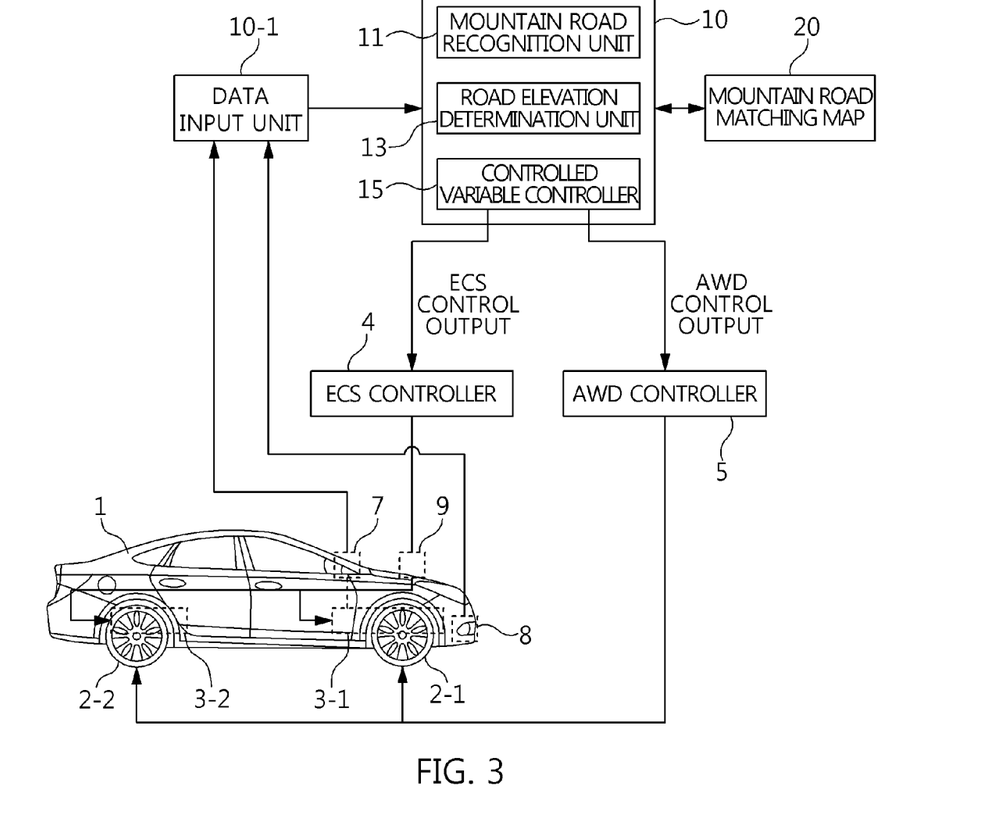
FIG. 3 is a diagram illustrating an example of a vehicle using the integrated chassis control to improve driving stability on the route of the mountain road according to the exemplary embodiment of the present invention.

Referring to FIG. 3, a vehicle 1 may include an electronic control suspension (ECS) controller 4 that controls the damping force of front- and rear-wheel suspensions 3-1 and 3-2, an all wheel drive (AWD) controller 5 that controls distribution of driving force to front and rear wheels 2-1 and 2-2, an in-vehicle device that includes a navigation 7, a camera 8, and a vehicle sensor 9, and an integrated chassis controller 10 that performs integrated chassis control to improve handling performance in flatland (e.g., non-mountain road) and mountain road traveling.

In detail, the ECS controller 4 is connected to the integrated chassis controller 10 to determine and output the controlled variable of the damper of a shock absorber forming the front- and rear-wheel suspensions 3-1 and 3-2, and renders the damping force control states of the respective front- and rear-wheel suspensions 3-1 and 3-2 HARD and SOFT (e.g., stiffness compared to HARD). The AWD controller 5 is connected to the integrated chassis controller 10 to render the driving force distribution state different by controlling the braking of each of the front and rear wheels 2-1 and 2-2. The navigation 7 is disposed in the vehicle, is connected to a global positioning system (GPS) together with a map, a place name, and road information for guidance of vehicle traveling, and is connected to the integrated chassis controller 10. The camera 8 is disposed in the vehicle to generate an image signal indicative of an image of the route of the road and send the image signal to the integrated chassis controller 10 and other controllers (e.g., engine ECU, etc.), and may be a stereo camera. The vehicle sensor 9 is disposed in the vehicle to detect sensor information (e.g., vehicle speed of a vehicle speed sensor, yaw rate/ longitudinal acceleration/lateral acceleration of acceleration sensor, etc.) according to a driving state and send the sensor information to the integrated chassis controller 10 and other controllers (e.g., engine ECU, etc.). Therefore, the front and rear wheels 2-1 and 2-2, the front- and rear-wheel suspensions 3-1 and 3-2, the ECS controller 4, the AWD controller 5, the navigation 7, the camera 8, and the vehicle sensor 9 are components of a typical vehicle system.

In detail, the integrated chassis controller 10 is connected to a data input device 10-1 and a mountain road matching map 20, and includes a mountain road recognition unit 11, a road elevation determination unit 13, and a controlled variable controller 15.

For example, the data input device 10-1 reads vehicle information (e.g., engine RPM, brake/accelerator pedal signal, gear shift range, coolant/oil temperature, etc.) together with the image signal of the camera 8 and the sensor information (e.g., vehicle speed, longitudinal/lateral acceleration, yaw rate, etc.) of the vehicle sensor 9 and sends them to the integrated chassis controller 10. The mountain road matching map 20 establishes a table map, relating to a road factor for curved mountain road determination (A), a lane factor for curved mountain road determination (B), a road condition satisfaction factor (F), a vehicle condition satisfaction factor (J), an uphill gradient factor (P), and a downhill gradient factor (Q), using a road gradient, an uphill/downhill road, a place name, a route number, etc., and is used in the integrated chassis controller 10 for control conditions and output values.

For example, the mountain road recognition unit 11 determines whether the vehicle drives on the route of the curved mountain road and a very winding road having a great difference of elevation, using the navigation and camera disposed in the vehicle, and the sensor information therein, for driving recognition of the vehicle on the route of the curved mountain road and a very winding road having a great difference of elevation. The road elevation determination unit 13 determines traveling on the uphill/downhill road, in which the loads of the front and rear wheels are excessively changed, by determining the state of a current driving road (uphill/downhill level) in a response to the same signal input thereto. The controlled variable controller 15 controls a distribution amount of torque of the AWD and a damping amount of front and rear rolls of the ECS according to the slope level of a road and the acceleration/deceleration level of a driver to determine and output the controlled variables of the ECS and the AWD according to the load change of the front and rear wheels.

Hereinafter, the integrated chassis control method will be described in detail with reference to FIGS. 2 to 9. Here, the integrated chassis controller 10 connected to the data input unit 10-1 and the mountain road matching map 20 is a control subject, and the damping force of the front- and rear-wheel suspensions 3-1 and 3-2 (i.e., shock absorber) by the ECS controller 4 and the driving force distribution to the front and rear wheels 2-1 and 2-2 (i.e., brake) by the AWD controller 5 are a control target.

The integrated chassis controller 10 performs an in-vehicle device check step (S10) for controlling a check for the route of a curved mountain road, a navigation detection step (S20), a camera detection step (S30), a vehicle sensor information utilization step (S40), and a curved mountain road check step (S50). These steps are implemented by the mountain road recognition unit 11 and the road elevation determination unit 13 of the integrated chassis controller 10.

Referring to FIG. 3, the integrated chassis controller 10 recognizes the navigation 7, the camera 8, and the vehicle sensor 9 as in-vehicle devices, and prioritizes them in the present order in terms of availability. Accordingly, the integrated chassis controller 10 utilizes navigation information when there is the navigation 7 in the navigation detection step (S20), utilizes camera information when there is not the navigation 7 but there is the camera 8, and utilizes sensor detection information related to the vehicle sensor 9 when there is not the camera 8. The reason is because the navigation 7 and the camera 8 are used to check the image of the route of the curved mountain road whereas the vehicle sensor 9 performs determination to check the route of the curved mountain road. Here, ">" and "<" are signs of inequality indicative of the size between two values.

In detail, the navigation detection step (S20) is changed to a navi-traveling information determination step (S20-1) according to the detection of the navigation, and a mountain name check step (S21) and a road condition satisfaction step (S22) are performed.

Figure 4:
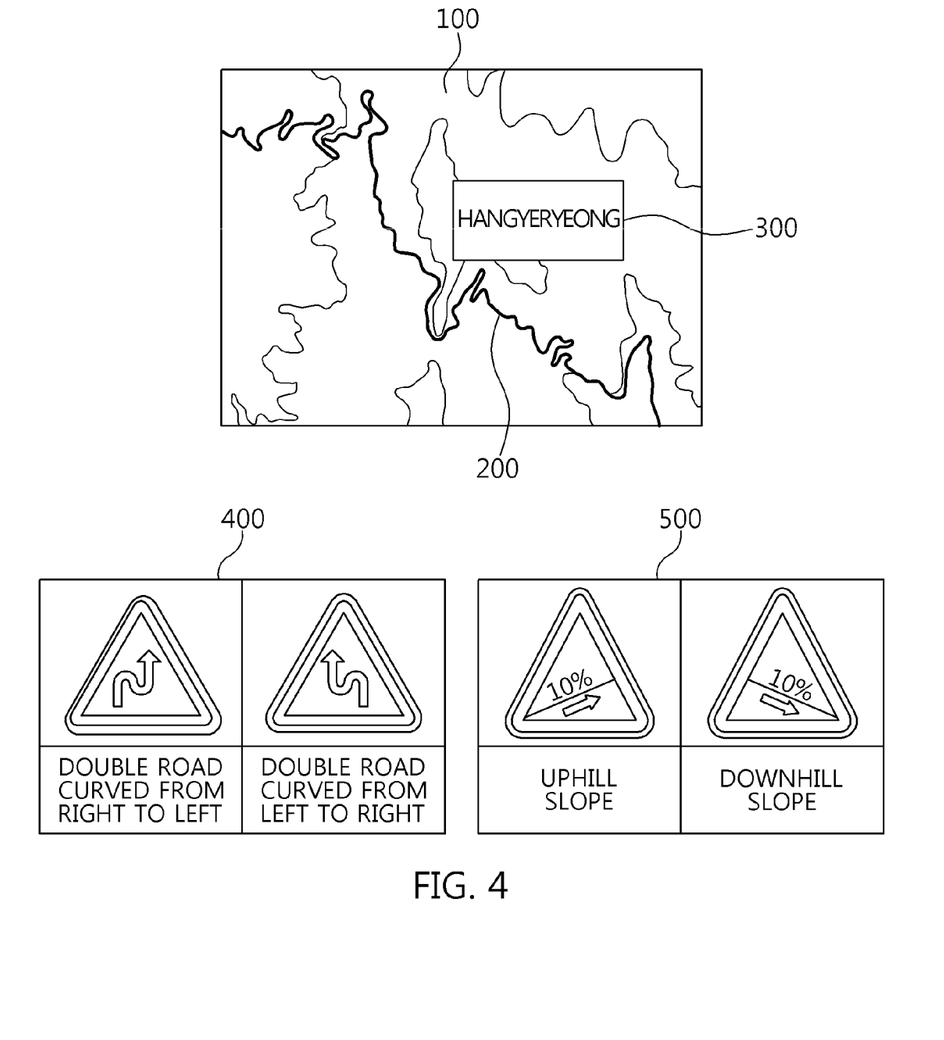
FIG. 4 is a diagram illustrating an example of navigation information for checking the route of a curved mountain road according to the exemplary embodiment of the present invention.

In regard to the mountain name check step (S21), referring to FIG. 4, since the navigation 7 is connected to the Global Positioning System (GPS) to display place name information 300, together with a mountain road 200 (i.e., the curved mountain road and a very winding road having a great difference of elevation) on which the vehicle 1 is currently driving, on a navigation map 100, the integrated chassis controller 10 checks a mountain name (S21) using the present information. When the mountain name of the mountain road 200 on which the vehicle is currently driving is checked as the place name information 300 on the navigation map 100, the process proceeds to the route of the curved mountain road check step (S50) while the navi-traveling information determination step (S20-1) is completed. On the other hand, when the mountain name of the mountain road 200 on which the vehicle is currently driving is not verified as the place name information 300 on the navigation map 100, the process proceeds to the road condition satisfaction step (S22).

The following road condition satisfaction equation is used in the road condition satisfaction step (S22):

road condition satisfaction: A (a-1 & a-2)>B.

Here, since "a-1" is a route number (e.g., Route 44 indicative of "Hangyeryeong") and "a-2" is navi-road curvature information (curvature of Route 44), "A" is a road factor for curved mountain road determination, which indicates the route number and the navi-road curvature information and is divided into "0" (flatland), "1" (slope of 10 to 20 degrees), and "2" (slope of 20 to 40 degrees), and "B" is a threshold for curved mountain road determination and is set as "1" (10 degree slope). Therefore, when the road factor for curved mountain road determination (A) is equal to or greater than the threshold (B), the process proceeds to the curved mountain road check step (S50) while the navi-traveling information determination step (S20-1) is completed. On the other hand, when the road factor for curved mountain road determination (A) is less than the threshold (B), it is determined that the road is a non-mountain road including a flatland so that normal integrated chassis control (S200) is performed. Here, the normal integrated chassis control means integrated chassis control performed on roads except for the route of the curved mountain road.

In detail, the camera detection step (S30) is changed to a camera image determination step (S30-1) according to the detection of the camera, and a road sign check step (S31) and a lane condition satisfaction step (S32) are performed.

In regard to the camera image determination step (S30-1), referring to FIG. 4, since the image signal of the camera 8 indicates a double-curved road sign 400 or an uphill/downhill slop sign 500 standing on the mountain road 200 on which the vehicle 1 is currently driving, the integrated chassis controller 10 checks a road sign (S31) using the present information. When the sign 400 or 500 is checked on the mountain road 200 on which the vehicle 1 is currently driving, the process proceeds to the curved mountain road check step (S50) while the camera image determination step (S30-1) is completed. On the other hand, when the sign 400 or 500 is not checked on the mountain road 200 on which the vehicle 1 is currently driving, the process proceeds to the lane condition satisfaction step (S32).

Figure 5:
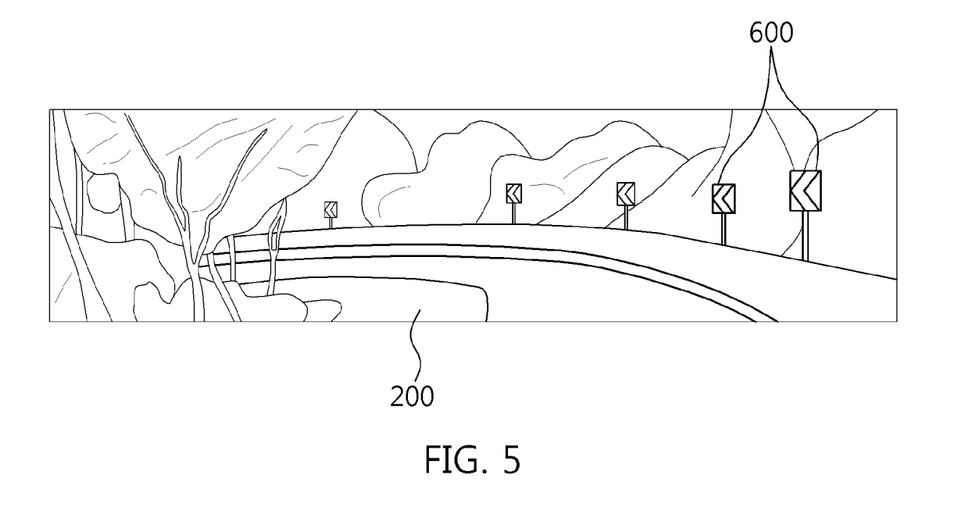
FIG. 5 is a diagram illustrating an example of camera information for checking the route of a curved mountain road according to the exemplary embodiment of the present invention.

In regard to the lane condition satisfaction step (S32), referring to FIG. 5, since the image signal of the camera 8 indicates a curved road arrow sign 600 standing on the mountain road 200 on which the vehicle 1 is currently driving, the following lane condition satisfaction equation is used therefor:

lane condition satisfaction: D (d-1 & d-2)>E.

Here, since "d-1" is a curved road arrow sign and "d-2" is camera-road curvature information (road curvature of arrow sign), "D" is a lane factor for curved mountain road determination, which indicates the camera-road curvature information and is divided into "0" (flatland), "1" (slope of 10 to 20 degrees), and "2" (slope of 20 to 40 degrees), and "E" is a threshold for curved mountain road determination and is set as "1" (10 degree slope). Therefore, when the lane factor for curved mountain road determination (D) is equal to or greater than the threshold (E), the process proceeds to the curved mountain road check step (S50) while the camera image determination step (S30-1) is completed. On the other hand, when the lane factor for curved mountain road determination (D) is less than the threshold (E), it is determined that the road is a non-mountain road including a flatland so that the normal integrated chassis control (S200) is performed.

In detail, the vehicle sensor utilization step (S40) includes a road condition satisfaction step (S41) and a vehicle condition satisfaction step (S42) according to the detection of the sensor information.

In the integrated chassis controller 10, the following road condition satisfaction equation is applied to the road condition satisfaction step (S41) and the following vehicle condition satisfaction equation is applied to the vehicle condition satisfaction step (S42):

road condition satisfaction: F (G>H)>I; and vehicle condition satisfaction: J (K<L & M>N)>O.

Here, "G" is an estimated road gradient absolute value, "H" is a road gradient threshold, "F" is a road condition satisfaction factor, and "I" is a set value for the number of times the road condition satisfaction factor is generated and is set as about three times. "K" is a traveling speed, "L" is a traveling speed threshold, "M" is a lateral acceleration absolute value, "N" is a lateral acceleration threshold, "J" is a vehicle condition satisfaction factor, and "O" is a set value for the number of times the vehicle condition satisfaction factor is generated and is set as about three times.

Figure 6:
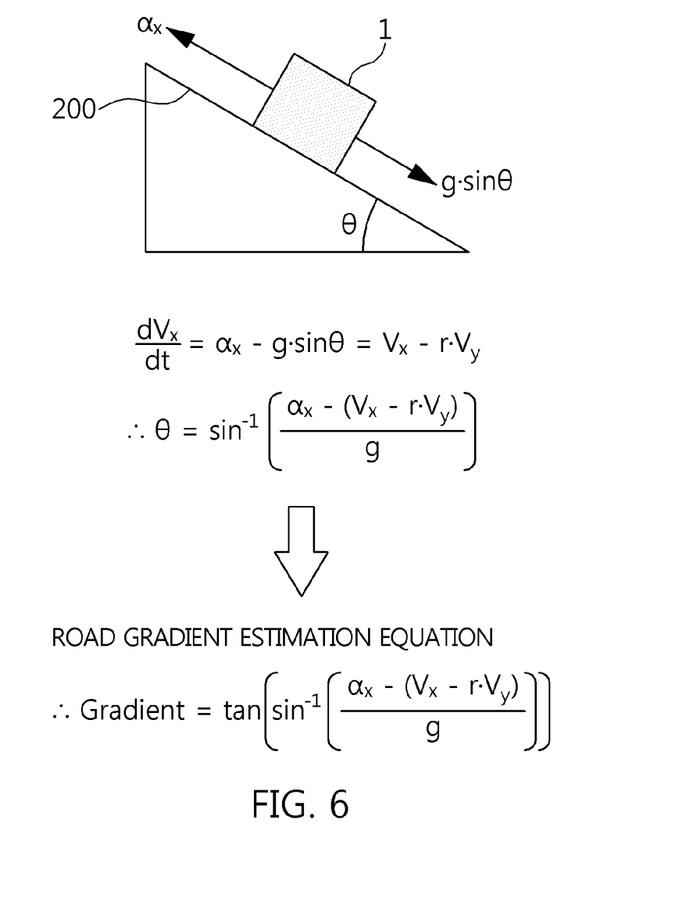
FIG. 6 is a diagram illustrating an example of vehicle sensor information for checking the route of a curved mountain road according to the exemplary embodiment of the present invention.

Meanwhile, the road gradient estimation is expressed by the following equation as in FIG. 6:

road gradient estimation:

$$\therefore \text{Gradient}[\%] = \tan\left(\sin^{-1}\left(\frac{a_x - (\dot{V}_x - \gamma \cdot V_y)}{g}\right)\right).$$

Here, "gradient" means an estimated road gradient absolute value (G), "ax" is a lateral acceleration, "$\dot{V}_x$" is a lateral traveling speed differential value, "y" is a yaw rate, "$V_y$" is a longitudinal traveling speed, and "g" is a gravitational acceleration.

Therefore, the road condition satisfaction is when the road condition satisfaction factor (F) is equal to or greater than the number of times of generaion (I) when the estimated road gradient absolute value is equal to or greater than the road gradient threshold, and the vehicle condition satisfaction is when the vehicle condition satisfaction factor (J) is equal to or greater than the number of times of generaion (O) when the traveling speed threshold (L) is equal to or greater than the traveling speed (K) and at the same time the lateral acceleration absolute value (M) is equal to or greater than the lateral acceleration threshold (N).

As a result, when the number of times the road condition satisfaction factor (F) is repeated is equal to or greater than about three times or the number of times the vehicle condition satisfaction factor (J) is repeated is equal to or greater than about three times, the process proceeds to the curved mountain road check step (S50) while the camera image determination step (S30-1) is completed. On the other hand, when the number of times the road condition satisfaction factor (F) is repeated is less than about three times or the number of times the vehicle condition satisfaction factor (J) is repeated is less than about three times, it is determined that the road is a non-mountain road including a flatland so that the normal integrated chassis control (S200) is performed.

Finally, in the integrated chassis controller 10, a mountain road flag is generated to check the route of the curved mountain road.

Next, the integrated chassis controller 10 performs a mountain road check step (S60), a camera information application step (S70), a vehicle sensor information application step (S80), and a curved mountain road entry step (S90). These steps are implemented by the mountain road recognition unit 11 and the road elevation determination unit 13 of the integrated chassis controller 10.

In detail, when the generated mountain road flag is not checked in the mountain road check step (S60), it is determined that the road is a non-mountain road including a flatland so that the normal integrated chassis control (S200) is performed. On the other hand, when the generated mountain road flag is checked, the process proceeds to the camera information application step (S70) and the vehicle sensor information application step (S80).

In the camera information application step (S70), it is checked whether there is a road sign as in S71. In the instant case, it is expected that the vehicle 1 is currently driving on an uphill road or a downhill road using an uphill/downhill slope sign 500 of FIG. 4 as the road sign. As a result, when the road sign is not checked in the camera information application step (S70), it is determined that the road is a non-mountain road including a flatland so that the normal integrated chassis control (S200) is performed. On the other hand, when the road sign is checked, the process proceeds to the curved mountain road entry step (S90).

In the vehicle sensor information application step (S80), a road gradient is determined by the following road gradient determination equation as in S81:

road gradient determination: P (G>H)>I or Q (G<H)>I.

Here, "G" is an estimated road gradient absolute value, "H" is a road gradient threshold, "P" is an uphill road gradient factor, "Q" is a downhill road gradient factor, and "I" is a set value for the number of times the uphill or downhill road gradient factor is generated and is set as about three times.

As a result, when the number of times the uphill or downhill road gradient factor (P or Q) is repeated is equal to or greater than about three times, the process proceeds to the curved mountain road entry step (S90). On the other hand, when the number of times the uphill or downhill road gradient factor (P or Q) is repeated is less than about three times, it is determined that the road is a non-mountain road including a flatland so that the normal integrated chassis control (S200) is performed.

Finally, in the integrated chassis controller 10, an ascent flag or a descent flag is generated with respect to the entry to the curved mountain road. The ascent flag is an uphill condition by the uphill road gradient factor (P) and the descent flag is a downhill condition by the downhill road gradient factor (Q).

The process proceeds to the mountain-road integrated chassis control (S100) for the integrated chassis control by the integrated chassis controller 10, the mountain-road integrated chassis control is divided into a mountain road division step using an ascent flag and a descent flag (S110), an uphill integrated chassis control step (S120), a downhill integrated chassis control step (S130), a front- and rear-wheel load change detection step (S140), a determination step of ECS and AWD controlled variables according to the level of front- and rear-wheel load change (S150), and an integrated chassis control completion determination step (S160). These steps are implemented by the controlled variable controller 15 of the integrated chassis controller 10.

In detail, in the uphill integrated chassis control step (S120), the uphill integrated chassis control is performed by determining the ascent flag (S110), the front- and rear-wheel load change is detected as in S140 during the uphill integrated chassis control to determine new ECS and AWD controlled variables according to the level of the front- and rear-wheel load change, and the determination process of the ECS and AWD controlled variables continues until the integrated chassis control is determined to be completed as in S160. To the present end, the integrated chassis controller 10 controls the controlled variable of the damper with the ECS controller 4 such that the rear-wheel damping force of the rear-wheel suspension 3-2 is increased at the initial time of the uphill integrated chassis control and simultaneously controls the distribution amount of driving force with the AWD controller 5 such that the rear-wheel driving force of the rear wheel 2-2 is increased. Next, the integrated chassis controller 10 detects a load change according to the change in damping force of the front- and rear-wheel suspensions 3-1 and 3-2 according to the acceleration and deceleration state of the vehicle, the uphill road surface state, and the like while the vehicle 1 drives on the uphill road, based on the initial ECS and AWD controlled variables, in the middle of the uphill integrated chassis control, and determines new ECS and AWD controlled variables according to the detected load change to change the initial values to new values.

Figure 7:
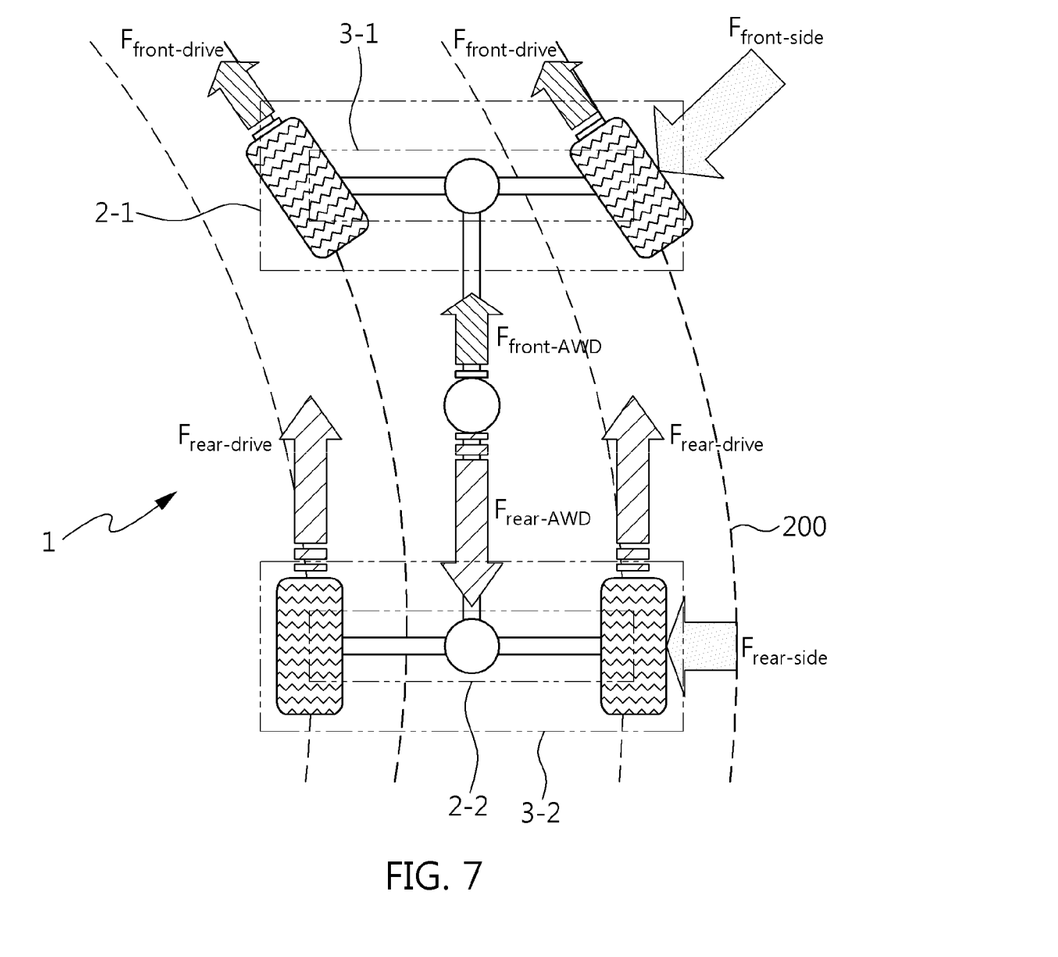
FIG. 7 is a diagram illustrating an example of uphill integrated chassis control of a vehicle on the curved mountain road according to the exemplary embodiment of the present invention.

Referring to FIG. 7, the vehicle 1 is controlled to be rear-wheeled, bringing about a decrease in front-wheel driving force ($F_{front\_AWD}$) and an increase in rear-wheel driving force ($F_{rear\_AWD}$), so that front-wheel lateral force ($F_{front\_side}$) is increased and rear-wheel lateral force ($F_{rear\_side}$) is decreased. Consequently, the turning stability and controllability of the vehicle 1 are controlled to improve handling performance (turning agility and stability) even in the uphill road by understeer compensation control.

In detail, in the downhill integrated chassis control step (S130), the downhill integrated chassis control is performed by determining the descent flag (S110), the front- and rear-wheel load change is detected as in S140 during the downhill integrated chassis control to determine new ECS and AWD controlled variables according to the level of the front- and rear-wheel load change, and the determination process of the ECS and AWD controlled variables continues until the integrated chassis control is determined to be completed as in S160. To the present end, the integrated chassis controller 10 controls the controlled variable of the damper with the ECS controller 4 such that the front-wheel damping force of the front-wheel suspension 3-1 is increased at the initial time of the downhill integrated chassis control and simultaneously controls the distribution amount of driving force with the AWD controller 5 such that the front-wheel driving force of the front wheel 2-1 is increased. Next, the integrated chassis controller 10 detects a load change according to the change in damping force of the front- and rear-wheel suspensions 3-1 and 3-2 according to the acceleration and deceleration state of the vehicle, the downhill road surface state, and the like while the vehicle 1 travels on the downhill road, based on the initial ECS and AWD controlled variables, in the middle of the downhill integrated chassis control, and determines new ECS and AWD controlled variables according to the detected load change to change the initial values to new values.

Figure 8:
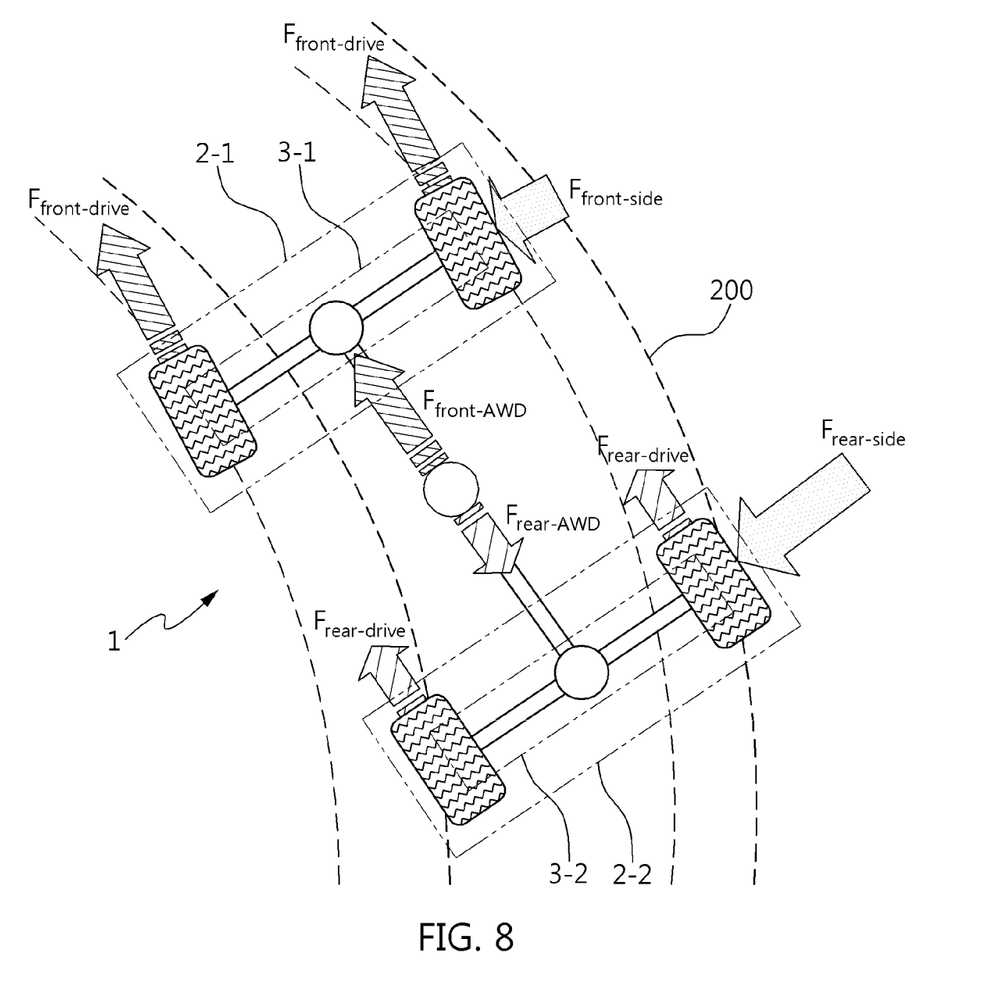
FIG. 8 is a diagram illustrating an example of downhill integrated chassis control of a vehicle on the curved mountain road according to the exemplary embodiment of the present invention.

Referring to FIG. 8, the vehicle 1 is controlled to be front-wheeled, bringing about an increase in front-wheel driving force ($F_{front\_AWD}$) and a decrease in rear-wheel driving force ($F_{rear\_AWD}$), so that front-wheel lateral force ($F_{front\_side}$) is decreased and rear-wheel lateral force ($F_{rear\_side}$) is increased. Consequently, the turning stability and controllability of the vehicle 1 are controlled to improve handling performance (turning agility and stability) even in the downhill road by oversteer compensation control.

Figure 9:
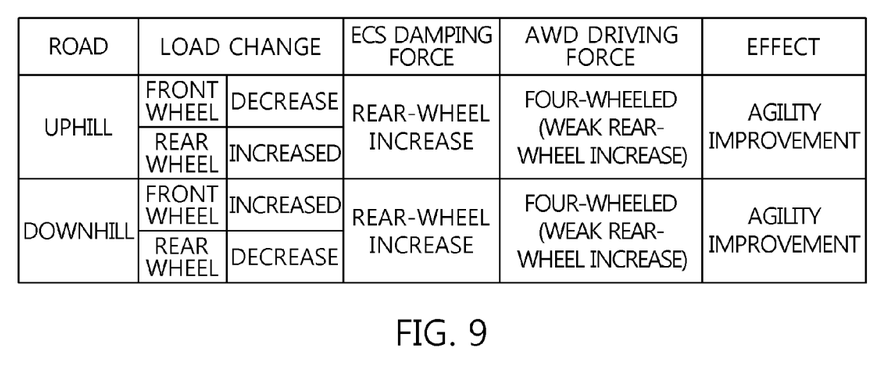
FIG. 9 is a diagram illustrating an example of a vehicle load change on the ascent/descent of the curved mountain road.
Figure 10:
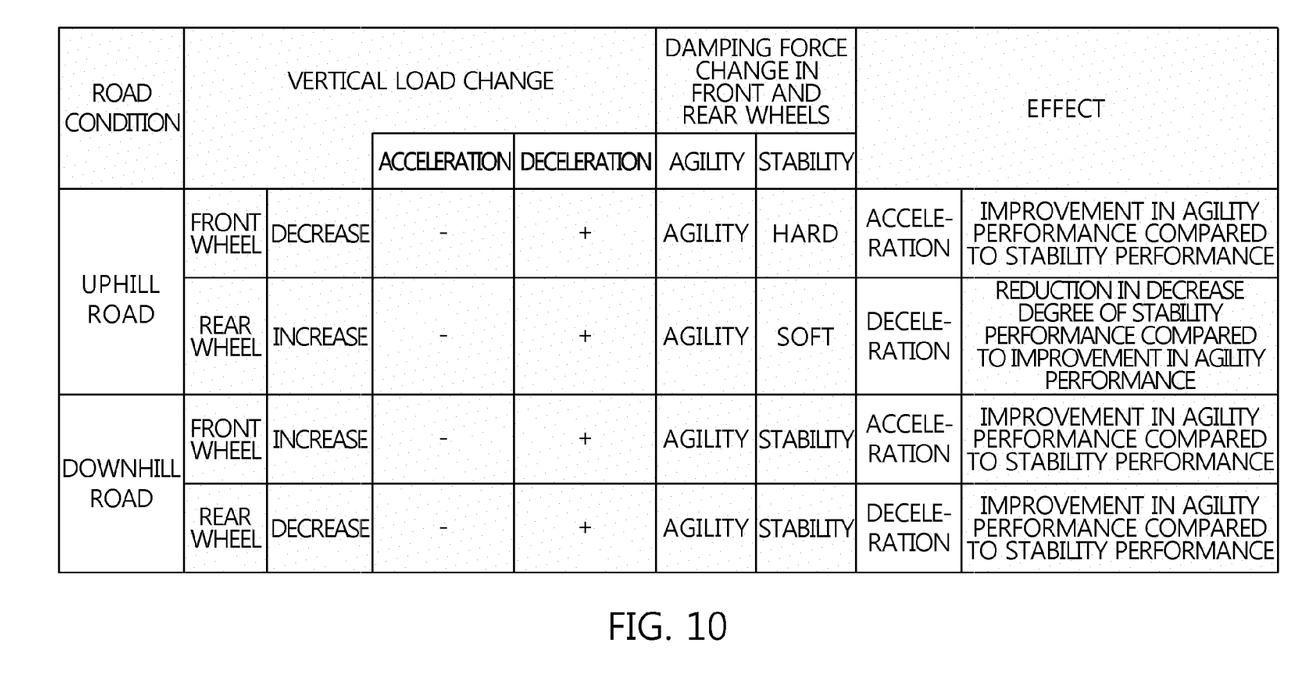
FIG. 10 is a diagram illustrating an effective example of uphill/downhill integrated chassis control on the curved mountain road according to the exemplary embodiment of the present invention.

Meanwhile, FIG. 9 and FIG. 10 illustrate tables relating to the controlled variable control of the ECS controller 4 and the AWD controller 5 for the respective uphill integrated chassis control and downhill integrated chassis control.

FIG. 9 illustrates an example of uphill integrated chassis control in which turning agility is improved since a decrease in lateral force is increased (front-wheel lateral force is relatively increased) and rear-wheel driving force is maximized due to the horizontal load change caused by increasing the damping force of the rear wheel, the load of which is increased in an uphill control manner. Furthermore, FIG. 9 illustrates an example of downhill integrated chassis control in which turning stability is improved since a decrease in lateral force is increased (rear-wheel lateral force is relatively increased) and front-wheel driving force is maximized due to the horizontal load change caused by increasing the damping force of the front wheel, the load of which is increased in a downhill control manner.

FIG. 10 illustrates an effect relating to understeer/oversteer compensation control when the damping force is controlled in a different manner according to driver's acceleration and deceleration in the condition of the uphill road and the downhill road of the curved mountain road.

As described above, the integrated chassis control to improve driving stability based on the route of the mountain road (i.e, the curved mountain road and a very winding road having a great difference of elevation) applied to the vehicle 1 according to the exemplary embodiment of the present invention performs the mountain-road integrated chassis control when the road is checked to be a curved mountain road by one of the navigation 7, the camera 8, and the vehicle sensor 9, and the mountain-road integrated chassis control is divided into the uphill integrated chassis control that performs the oversteer compensation control by increasing the rear-wheel damping force of the rear-wheel suspension 3-2 and increasing the rear-wheel driving force of the rear wheel 2-2, and the downhill integrated chassis control that performs the understeer compensation control by increasing the front-wheel damping force of the front-wheel suspension 3-1 and increasing the front-wheel driving force of the front wheel 2-1. Thus, it is possible to improve the turning stability and handling performance of the vehicle 1 by integrated ECS/AWD control considering the load change thereof in the very winding road traveling condition of the curved mountain road.

As is apparent from the above description, the vehicle of the present invention has the following action and effect by performing the integrated chassis control to improve driving stability on the route of the mountain road.

Firstly, it is possible to improve the performance of the integrated chassis control since the area of the integrated chassis control is expanded to the great difference of elevation of the curved mountain road. Secondly, it is possible to maintain vehicle driving stability by controlling the torque of the AWD and the distribution of the front- and rear-roll damping force of the ECS even in the very winding road driving condition. Thirdly, since the torque of the AWD and the distribution of the front- and rear-roll damping force of the ECS are controlled based on the vehicle load change, it is possible to improve handling performance by improvement in turning agility and stability even on the very winding road. Fourthly, since the AWD and the ECS are controlled based on the vehicle load change, it is possible to perform the integrated chassis control only by controlling the torque of the AWD and the distribution of the front- and rear-roll damping force of the ECS. Fifthly, since the integrated chassis control is performed by the AWD or the ECS, it is possible to resolve a concern about contradictory function conflict according to the operation of the AWD and the ECS.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated chassis control method comprising:
   performing, by an integrated chassis controller, a mountain-road integrated chassis control of allowing electronic control suspension (ECS) damping force and all wheel drive (AWD) torque distribution to be controlled in a different manner according to uphill and downhill roads due to a difference of elevation of a mountain road, when a road on which a vehicle drives is verified to be a route of the mountain road by the integrated chassis controller,
   wherein normal integrated chassis control is performed according to a non-mountain road including a flatland when the route of the mountain road is not verified.

2. The integrated chassis control method of claim 1, wherein the mountain-road integrated chassis control includes:
   curved mountain road check control in which the route of the mountain road is determined to be a route of a curved mountain road based on information generated by an in-vehicle device of the vehicle and a mountain road flag is generated;
   curved mountain road entry control in which the mountain road includes the uphill road and the downhill road and an ascent flag on the uphill road and a descent flag on the downhill road are generated;
   uphill integrated chassis control in which the ECS damping force and the AWD torque distribution are controlled according to the generated ascent flag; and
   downhill integrated chassis control in which the ECS damping force and the AWD torque distribution are controlled according to the generated descent flag.

3. The integrated chassis control method of claim 2, wherein the curved mountain road check control includes:
   checking each of a navigation, a camera, and a vehicle sensor used as the in-vehicle device;
   determining the curved mountain road based on road position information on a mountain name and navi-road curvature information on a road condition according to navi-information when the navigation is checked;
   determining the curved mountain road based on road sign information on a road sign and camera-road curvature information on a lane condition according to image information of the camera when the camera is checked; and
   determining the curved mountain road based on road gradient information as a road information and vehicle lateral acceleration information as a vehicle information according to sensor information when the vehicle sensor is checked.

4. The integrated chassis control method of claim 3, wherein the road position information is place name information, and the navi-road curvature information is road curvature information according to a route number.

5. The integrated chassis control method of claim 3, wherein the road sign information is a double-curved road sign or an uphill/downhill slop sign, and the camera-road curvature information is road curvature information on a curved road arrow sign.

6. The integrated chassis control method of claim 3, wherein the road gradient information and the vehicle lateral acceleration information are an estimated road gradient absolute value and a lateral acceleration absolute value relating to vehicle speed and acceleration, respectively.

7. The integrated chassis control method of claim 6, wherein the estimated road gradient absolute value and the lateral acceleration absolute value are each equal to or greater than a predetermined number of times of repetition, and are used for the road gradient information and the vehicle lateral acceleration information.

8. The integrated chassis control method of claim 2, wherein the curved mountain road entry control includes:
   checking each of a camera and a vehicle sensor used as the in-vehicle device;
   checking the uphill road and the downhill road based on an uphill/downhill slop sign according to image information of the camera when the camera is checked;
   checking the uphill road and the downhill road based on an estimated road gradient absolute value when the vehicle sensor is checked; and
   generating the ascent flag on the uphill road when the uphill road is checked while generating the descent flag on the downhill road when the downhill road is checked.

9. The integrated chassis control method of claim 8, wherein the estimated road gradient absolute value is used to verify the uphill road and the downhill road when the estimated road gradient absolute value is equal to or greater than a predetermined number of times of repetition.

10. The integrated chassis control method of claim 3, wherein the uphill integrated chassis control includes:
    controlling a controlled variable of a damper with an ECS controller connected to the integrated chassis controller according to an increase in rear-wheel damping force of a rear-wheel suspension for controlling the ECS damping force while controlling a distribution amount of torque with an AWD controller connected to the integrated chassis controller according to an increase in rear-wheel driving force of a rear wheel for controlling the AWD torque distribution;

detecting a load change according to a change in damping force of the front- and rear-wheel suspensions when the vehicle travels on the uphill road;

controlling the controlled variable of the damper and a distribution amount of the driving force according to the detected load change while performing oversteer compensation control by applying the controlled variable of the damper and the distribution amount of the driving force to the control of the ECS damping force and the control of the AWD torque distribution; and completing the oversteer compensation control by repeating the detection of the load change.

11. The integrated chassis control method of claim 3, wherein the downhill integrated chassis control includes:

controlling a controlled variable of a damper with an ECS controller connected to the integrated chassis controller according to an increase in front-wheel damping force of a front-wheel suspension for controlling the ECS damping force while controlling a distribution amount of torque with an AWD controller connected to the integrated chassis controller according to an increase in front-wheel driving force of a front wheel for controlling the AWD torque distribution;

detecting a load change according to a change in damping force of the front- and rear-wheel suspensions when the vehicle travels on the downhill road;

controlling the controlled variable of the damper and a distribution amount of the driving force according to the detected load change while performing understeer compensation control by applying the controlled variable of the damper and the distribution amount of the driving force to the control of the ECS damping force and the control of the AWD torque distribution; and completing the understeer compensation control by repeating the detection of the load change.

12. A vehicle comprising:

an electronic control suspension (ECS) controller configured for controlling damping force of each of front- and rear-wheel suspensions;

an all wheel drive (AWD) controller configured for controlling distribution of torque to each of front and rear wheels;

an in-vehicle device including one of a navigation, a camera, and a vehicle sensor; and an integrated chassis controller connected to the ECS controller and the AWD controller and configured for performing mountain-road integrated chassis control allowing, when a route of a mountain road is verified based on information generated by one of the navigation, the camera, and the vehicle sensor, wherein ECS damping force and AWD torque distribution are controlled with the ECS controller and the AWD controller in a different manner according to uphill and downhill roads of the mountain road.

13. The vehicle of claim 12, wherein the integrated chassis controller includes:

a mountain road recognition unit configured to recognize the route of the mountain road as a curved mountain road;

a road elevation determination unit configured to determine that the uphill and downhill roads have a difference of elevation; and a controlled variable controller configured to determine each of a controlled variable of the ECS controller for controlling the ECS damping force and a controlled variable of the AWD controller configured for controlling AWD driving force distribution.

14. The vehicle of claim 12, wherein the integrated chassis controller is configured to perform integrated chassis control for a route of a non-mountain road by changing the mountain-road integrated chassis control to a normal integrated chassis control when the mountain-road integrated chassis control is not performed.

* * * * *